(12) United States Patent
Sanada et al.

(10) Patent No.: US 6,367,134 B1
(45) Date of Patent: Apr. 9, 2002

(54) METHOD OF PRODUCING A CERAMIC ELECTRONIC PART

(75) Inventors: Yukio Sanada, Fukui; Shinichiro Kuroiwa, Takefu; Kyoumi Tsukida, Fukui-ken; Masayuki Taniguchi, Fukui, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/496,637

(22) Filed: Feb. 2, 2000

(30) Foreign Application Priority Data

Feb. 4, 1999 (JP) ............................................. 11-027790

(51) Int. Cl.[7] .................................................. H01G 4/12
(52) U.S. Cl. ........................... 29/25.42; 29/608; 451/32; 451/34; 451/85; 451/328
(58) Field of Search ............................... 29/25.42, 608; 451/32, 33, 35, 34, 328, 85, 86, 78

(56) References Cited

U.S. PATENT DOCUMENTS 3,553,897 A * 1/1971 Bobkowski ............... 451/85 X
5,672,094 A * 9/1997 Nishimura et al. .......... 451/32

FOREIGN PATENT DOCUMENTS

| JP | 7-192967 | 7/1995 |
| JP | 11-340089 | 12/1999 |

* cited by examiner

*Primary Examiner*—Carl E. Hall
(74) *Attorney, Agent, or Firm*—Ostrolenk, Faber, Gerb & Soffen, LLP (57) ABSTRACT

A ceramic electronic part producing method, in which when a ceramic electronic part having an internal electrode in a ceramic sintered body and having an external electrode connected to the internal electrode at an outside surface thereof is to be produced, a ceramic sintered body is obtained, and then subjected to dry-type barrel polishing, which does not use water, using a centrifugal barrel device in order to expose the internal electrode from an outside surface of the ceramic sintered body. The method is one in which the problem of deterioration of electrical properties, such as insulation resistance property, caused by entrance of moisture during polishing, seldom occurs and in which a large number of highly reliable ceramic electronic parts can be produced.

7 Claims, 7 Drawing Sheets

METHOD OF PRODUCING A CERAMIC ELECTRONIC PART

BACKGROUND OF THE INVENTION

1. Field of the Invention

The present invention relates to a method of producing a ceramic electronic part using a ceramic sintered body with an internal electrode, such as a layered capacitor, and more particularly to a method of producing a ceramic electronic part in which the polishing step carried out to expose the internal electrode from an outside surface of the ceramic sintered body is improved.

2. Description of the Related Art

When producing a ceramic electronic part including an internal electrode, such as a layered capacitor, it is necessary that the internal electrode be reliably electrically connected to an external electrode at the final stage. Ordinarily, the ceramic sintered body is formed by placing unsintered ceramic layers one on top of the other with an internal electrode located between each adjacent pair of electrodes, and then firing the unsintered ceramic layered body. However, in the ceramic sintered body formed in the above-described way, the contraction rates of the internal electrodes and the ceramic layers during the firing process are different, so that the internal electrodes may not be exposed from the outside surface of the ceramic sintered body. This is illustrated in FIGS. 10 and 11.

Figure 10:
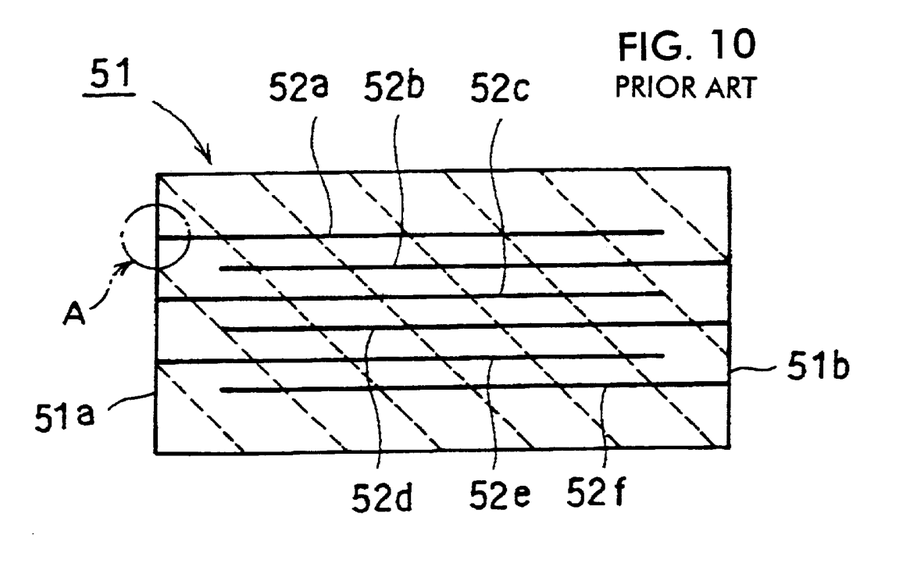
FIG. 10 is a vertical sectional view of a sintered body, used to illustrate a conventional method of producing a layered capacitor.
Figure 11:
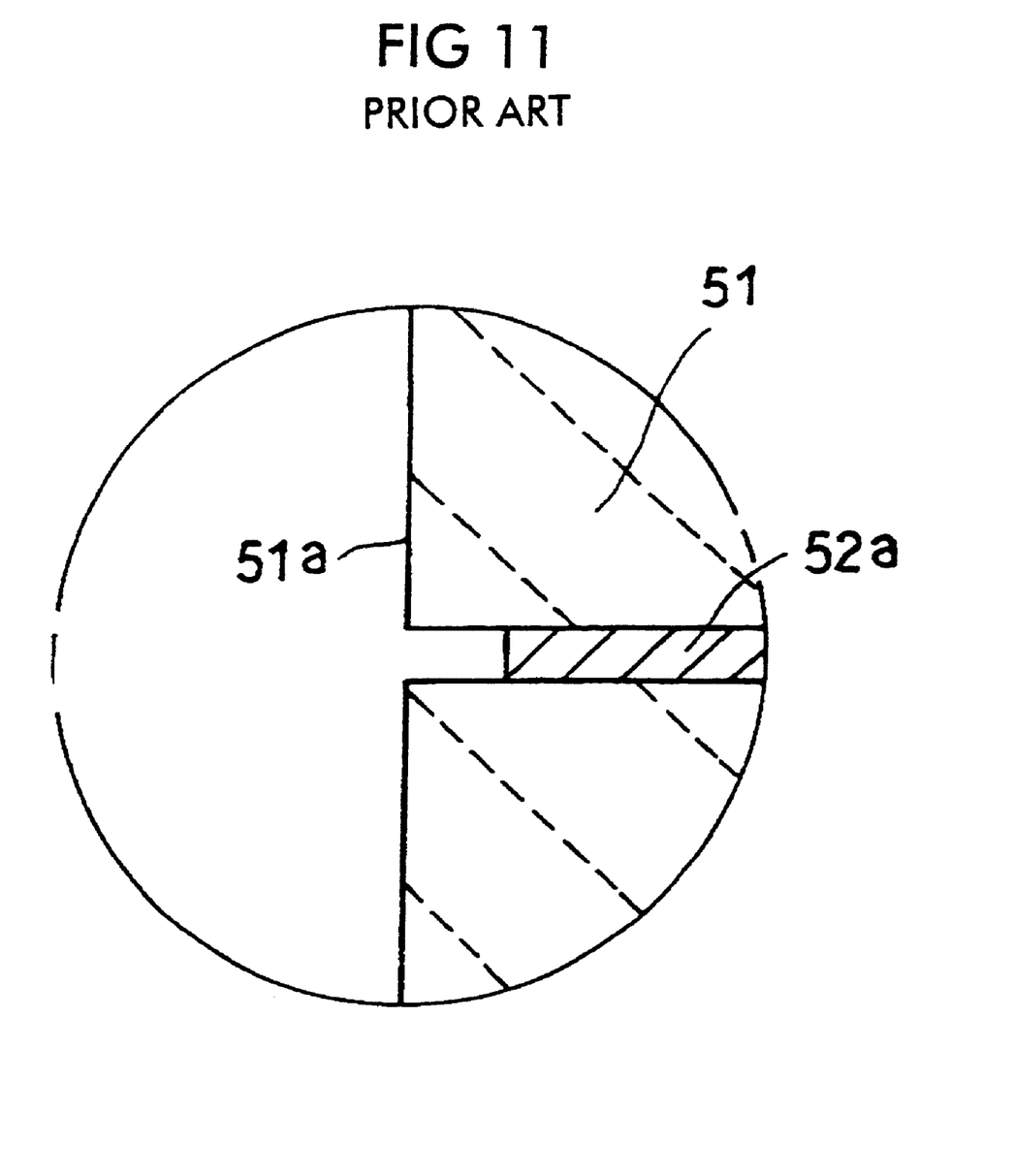
FIG. 11 is a partial sectional view illustrating in enlarged form the portion enclosed by circle A of FIG. 10.

FIG. 10 is a vertical sectional view of a ceramic sintered body used in a layered capacitor. A plurality of internal electrodes 52a to 52f are formed in the ceramic sintered body 51. Because external electrodes are formed at end surfaces 51a and 51b of the ceramic sintered body 51 during a later step, it is necessary that the internal electrodes 52a, 52c, and 52e be reliably exposed from the end surface 51a, and that the internal electrodes 52b, 52d, and 52f be reliably exposed at the end surface 51b.

However, since the contraction rates of the ceramic layers and the internal electrodes are different the internal electrodes are often located inward of the end surfaces after sintering and are thus often not exposed from the end surface 51a or 51b. This is shown, by way of example, in FIG. 11 wherein the internal electrode 52a is disposed inward from the end surface 51a.

Conventionally, in order to expose the internal electrodes 52a to 52f, a wet-polishing method is used to polish the aforementioned ceramic sintered body 51 that has been obtained. More specifically, a plurality of the sintered bodies 51, an abrasive, and water are placed into a barrel and the barrel is rotated in order to polish the ceramic sintered bodies 51, thereby exposing the internal electrodes 52a to 52f from the end surface 51a or 51b.

Water is used as a shock-absorbing material to reduce impact force. The use of water prevents cracking of the ceramic sintered bodies 51 caused by collisions of the ceramic sintered bodies 51 themselves and collisions of the abrasive and the ceramic sintered bodies 51.

In addition to the above-described wet-barrel polishing method, a sandblast method is sometimes used to polish the end surfaces 51a and 51b of the ceramic sintered bodies 51. In the sandblast method, the ceramic sintered bodies 51 are held by a holder having a plurality of holes arranged in a row, and the exposed end surfaces 51a and 51b are subjected to sandblasting.

The above-described wet-barrel polishing method allows the internal electrodes 52a to 52f to be reliably exposed from the end surface 51a or 51b of the ceramic sintered bodies 51, but has the problem of water flowing into the ceramic sintered bodies 51. More specifically, the water used as the shock-absorbing material tends to move in through the interfaces between the internal electrodes 52a to 52f and the ceramics layers. This water cannot be easily removed from the ceramic sintered bodies 51, and reacts during firing of the external electrodes carried out later, thereby accelerating peeling at the interfaces between the ceramics and the internal electrodes 52a to 52f.

When the conventional wet-barrel polishing method using water is used, interlayer peeling, called delamination, tends to occur in the layered capacitors obtained at the final stage, thereby reducing insulation resistance and the rate at which properly produced layered capacitors is obtained.

When the above-described sandblast method is used, water is not required because polishing is carried out by directly ejecting an abrasive onto the end surfaces 51a and 51b of the ceramic sintered bodies. However, it is necessary to carry out the troublesome step of holding the plurality of ceramic sintered bodies by a holder, thereby preventing a large number of ceramic sintered bodies to be produced efficiently.

SUMMARY OF THE INVENTION

Accordingly, it is an object of the present invention to provide a highly productive ceramic electronic part producing method which allows an internal electrode to be reliably exposed from an end surface of a ceramic sintered body by dry-barrel polishing that does not use water, so that delamination and deterioration in electrical properties do not easily occur, and so that the end surface of the ceramic sintered body can be efficiently polished.

To this end, according to the present invention, there is provided a method of producing a ceramic electronic part including an internal electrode in a ceramic sintered body and an external electrode electrically connected to the internal electrode at an outside surface of the ceramic sintered body, the method comprising the steps of:

obtaining the ceramic sintered body including the internal electrode; and exposing the internal electrode from the outside surface of the ceramic sintered body by subjecting the ceramic sintered body to dry-barrel polishing.

When the dry-type barrel polishing is carried out, a dry-type centrifugal barrel device may be used, the dry-type centrifugal barrel device including a rotary plate that rotates around a rotary shaft as a center; a first drive source, connected to the rotary plate, for rotationally driving the rotary plate; a barrel pot connected to the rotary plate so as to rotate along with the rotary plate around the rotary shaft of the rotary plate and independently of the rotary plate, the barrel plate accommodating the ceramic sintered body therein; and a second drive source, connected to the barrel pot, for rotationally driving the barrel pot. In this case, the ceramic sintered body may be placed into the barrel pot, and the rotary plate and the barrel pot may be rotated.

When the dry-type barrel polishing is carried out, a barrel blast device may be used. Such a barrel blast device may include a barrel pot constructed so as to rotate around a central rotary shaft, the barrel pot having an opening; a blast nozzle for ejecting therefrom an abrasive towards the opening in the barrel pot; and a drive source, connected to the barrel pot, for rotationally driving the barrel pot. In this case, a plurality of the ceramic sintered bodies may be placed into the barrel pot, and as the barrel pot may be rotated while the abrasive is ejected from the blast nozzle to carry out the dry-barrel polishing.

At least a portion of the barrel pot may be formed of meshes or of a member with many holes.

The ceramic sintered body may be formed by obtaining an unsintered ceramic layered body and rounding a corner of the unsintered layered body by subjecting the unsintered ceramic layered body to the barrel polishing.

A dry centrifugal device may be used to carry out the barrel polishing. Such a device may include a first drive source, connected to a rotary plate, for rotationally driving the rotary plate; a barrel pot connected to the rotary plate so as to rotate along with the rotary plate around a rotary shaft of the rotary plate and independently of the rotary plate, the barrel plate accommodating the ceramic sintered body therein; and a second drive source, connected to the barrel pot, for rotationally driving the barrel pot.

BRIEF DESCRIPTION OF THE DRAWINGS

Other features and advantages of the present invention will become apparent from the following description of the invention which refers to the accompanying drawings.

DESCRIPTION OF THE PREFERRED EMBODIMENTS

A detailed description will now be given of specific embodiments of the present invention with reference to the drawings wherein like numerals indicate like elements.
(First embodiment)

The first embodiment can be used to polish layered capacitors whose dimensions are, for example, 2.0 mm×1.2 mm×1.2 mm and whose capacitance is 1 $\mu$F. These capacitors may be produced as follows. Internal electrodes are printed on ceramic green sheets, and the so printed ceramic green sheets are placed one upon the other to form a generally rectangular body. Then, plain ceramic green sheets (sheets not provided with the internal electrodes) are placed on the top and the bottom of the rectangular body in order to form a mother ceramic layered body. The mother ceramic layered body is pressed in its thickness direction, and then cut in the thickness direction in order to form unsintered ceramic bodies from which individual layered capacitors are to be formed.

A centrifugal barrel polishing device described with reference to FIGS. 1 to 5 is then used to polish the unsintered ceramic layered bodies in order to round the corners of the unsintered ceramic layered bodies. The step of rounding the corners is primarily carried out to remove burrs from the unsintered ceramic layered bodies so that, for example, the corners after sintering have a radius of curvature of 70 $\mu$m.

Figure 1:
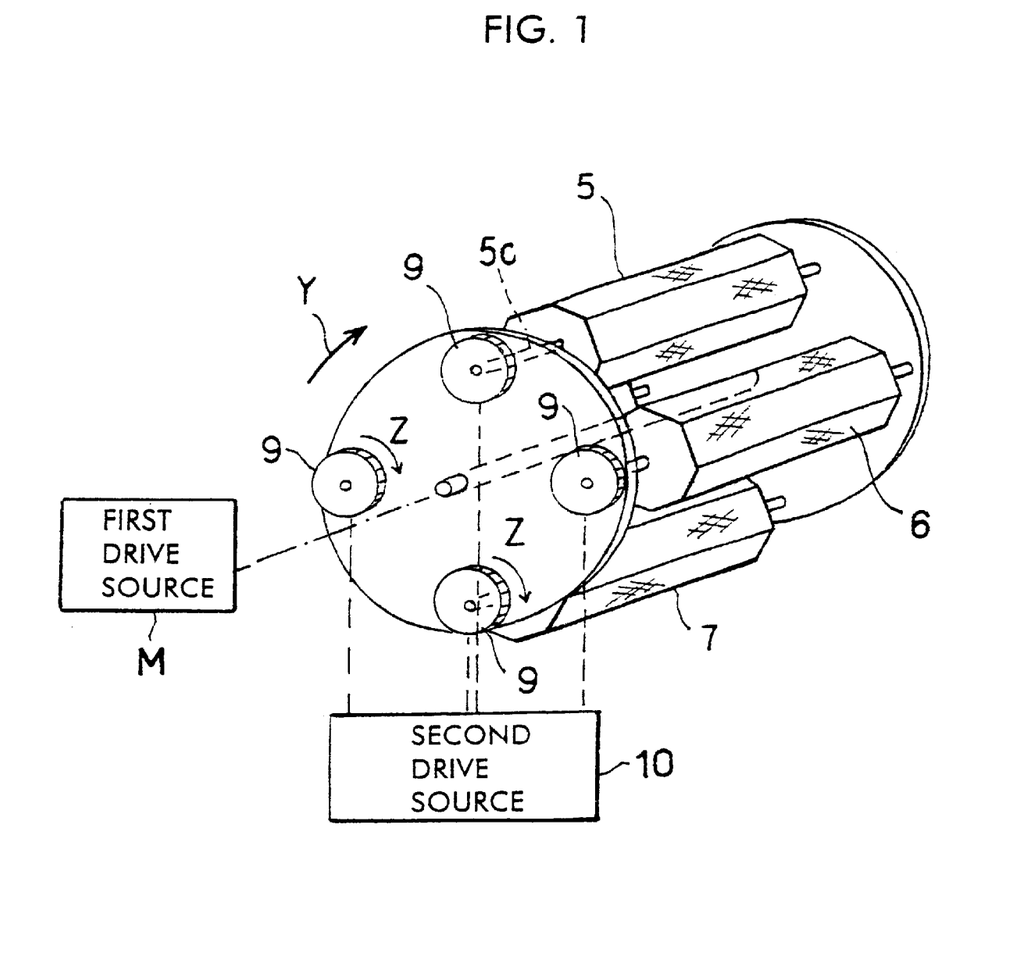
FIG. 1 is a perspective view of a centrifugal barrel device according to a first embodiment of the present invention.
Figure 2:
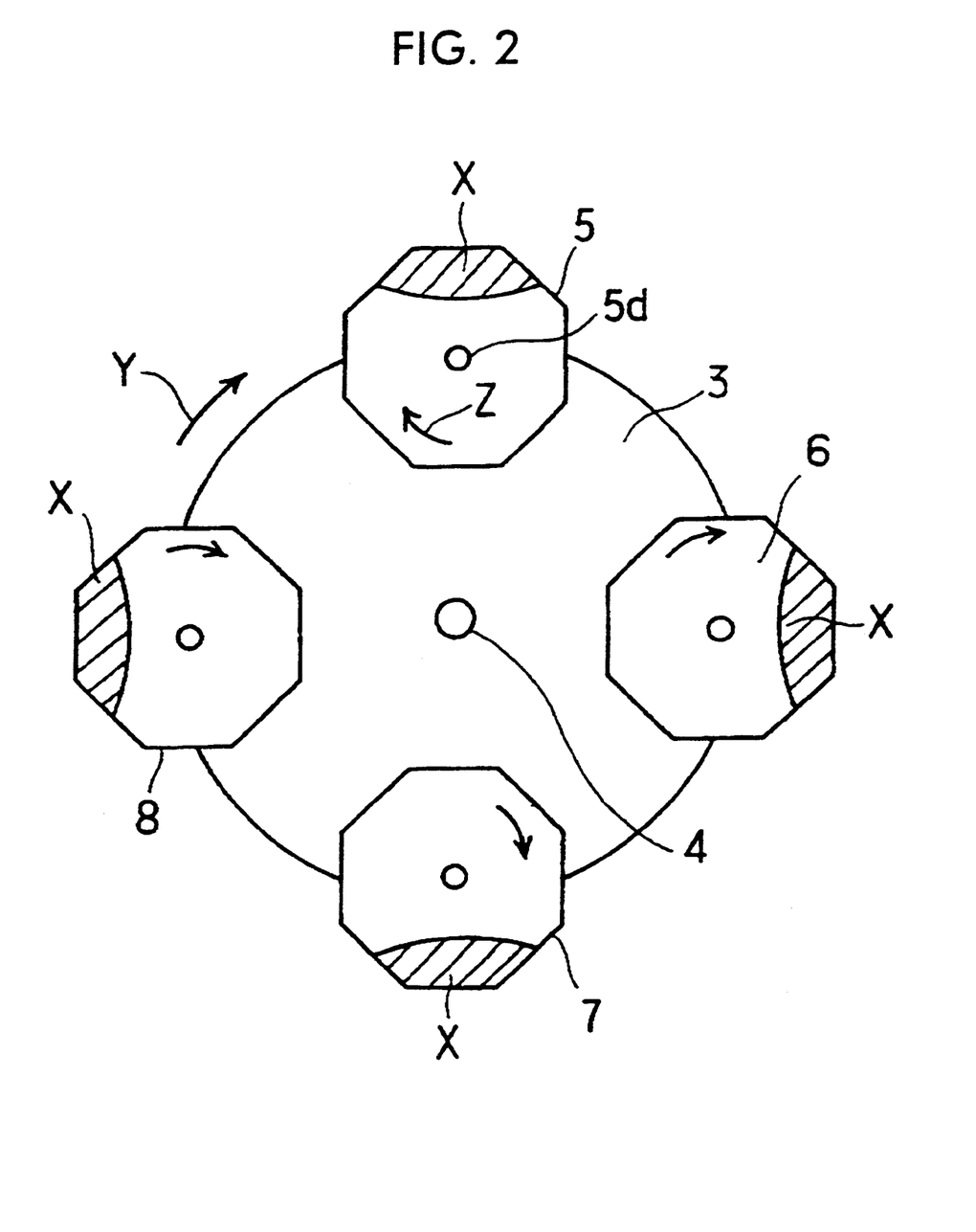
FIG. 2 is a schematic side view of the centrifugal barrel device of FIG. 1 with one of the side rotary plates removed.

FIG. 1 is a perspective view of a centrifugal barrel polishing device designated generally as 1. Device 1 comprises a pair of rotary plates 2 and 3. In FIG. 2, only the rear rotary plate 3 is shown. The rotary plates 2 and 3 are coupled by a rotary shaft 4. The rotary shaft 4 is connected to a rotational drive source M schematically shown in FIG. 1. The rotational drive source M is any suitable rotational drive device such as a motor. The rotary plates 2 and 3 are constructed so that they rotate around the rotary shaft 4 as a center.

A plurality of barrel pots 5 to 8 are disposed between the rotary plates 2 and 3. Using barrel pot 5 as an example, the structures of the barrel pots 5 to 8 will be described with reference to FIGS. 3 and 4.

Figure 4:
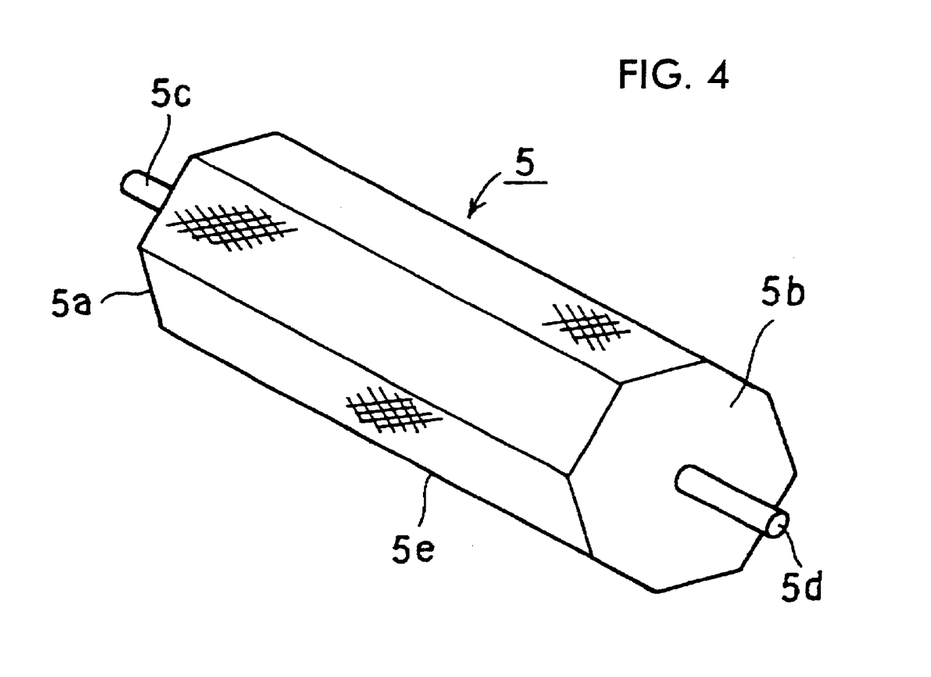
FIG. 4 is a perspective view of a barrel pot used in the centrifugal barrel device.
Figure 5:
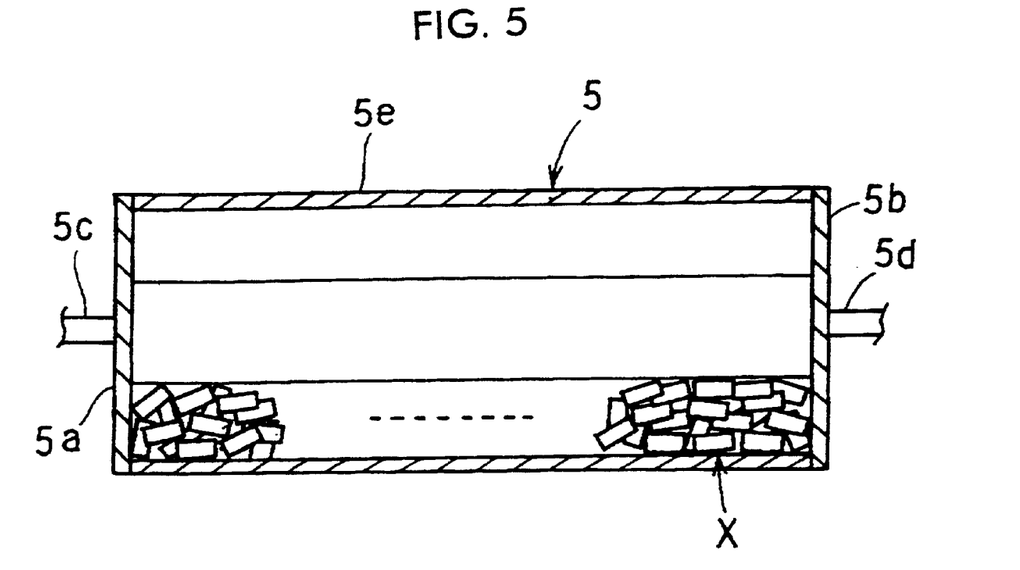
FIG. 5 is a vertical sectional view of the barrel pot showing ceramic sintered bodies in the barrel pot.

As shown in FIG. 4, the barrel pot 5 preferably has an octagonal tube-like shape. It is formed of mesh containing a plurality of through holes, the mesh being schematically shown by hatching in FIG. 4. One suitable alternative is a member having many through holes formed therein. It is not necessary for the entire pot 5 to be formed of mesh or a member having many holes.

Rotary shafts 5c and 5d are mounted to end surfaces 5a and 5b, respectively, of the barrel pot 5 so as to extend outward in lengthwise directions of the barrel pot 5. The rotary shafts 5c and 5d are disposed concentrically with one another.

Figure 3:
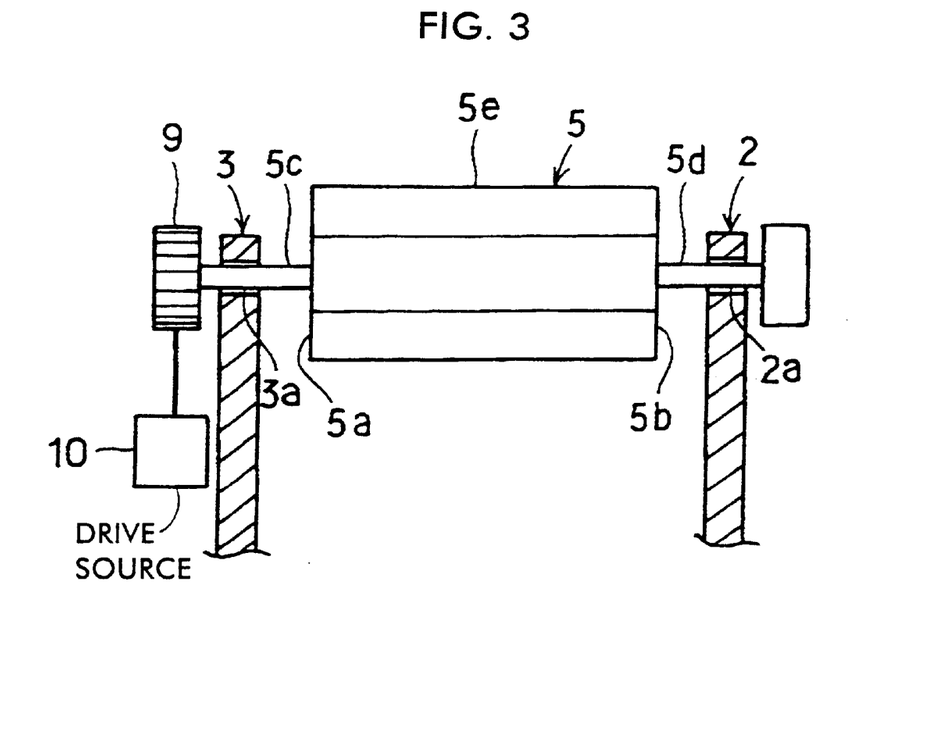
FIG. 3 is a sectional view of a portion of the embodiment of FIG. 1.

As shown in FIG. 3, the rotary shafts 5c and 5d extend through holes 2a and 3a in the rotary plates 2 and 3 so that the barrel pot 5 is mounted to the rotary plates 2 and 3 and can rotate independently of the rotary plates 2 and 3. A gear 9 is mounted to an outer end of the rotary shaft 5c. The gear 9 is connected to a rotational drive source 10 shown schematically in FIG. 3. The rotational drive source 10 is any suitable drive device, such as a motor, that provides a rotational drive force. Driving the rotational drive source 10 rotates the gear 9, and the rotation of the gear 9 rotates the barrel pot 5 independently of the rotation of the rotary plates 2 and 3.

The other barrel pots 6 to 8 have structures similar to the structure of the above-described barrel pot 5.

Doors are placed on the barrel pots 5 to 8 so that ceramic layered bodies may be placed into and taken from the barrel pots. In the preferred embodiment, side surface 5a of the barrel pot is constructed so that it can be opened and closed with respect to a cylindrical body 5e for this purpose.

The unsintered ceramic layered bodies are placed into the barrel pots 5 to 8 and subjected to barrel polishing to round the corners of the unsintered ceramic layered bodies by rotation of the barrel pots 5 to 8. The barrel pots are rotated at preferably 150 rpm. As they are rotated on their own axis, the rotary plates 2 and 3 are rotated about their axis, also preferably at 150 rpm so that each barrel pot rotates once about its respective axis during a single revolution of the rotary plates 2 and 3.

As the rotary plates 2 and 3 rotate, the unsintered ceramic layered bodies move while being pushed against the radially outer surface of each of the barrel pots 5 to 8 in the directions of the diameters of the rotary plates 2 and 3 as a result of centrifugal force, as shown by areas X in FIG. 1. More specifically, during the rotation of the rotary plates 2 and 3 in the direction of arrow Y, the ceramic layered bodies that have been placed in the barrel pots 5 to 8 move while being pushed against the outer surfaces of the barrel pots 5 to 8 in the radially outward directions of the rotary plates 2 and 3. During a single rotation of the rotary plates 2 and 3, the barrel pots 5 to 8 themselves preferably rotate once in the direction of arrow Z, that is, in the same direction as the rotary plates 2 and 3. Accordingly, the ceramic layered body aggregate in the area denoted by the letter X and are subjected to the above-described polishing as a result of moving along the inside surface of each of the barrel pots 5 to 8 in a single circle.

Thereafter, the ceramic layered bodies whose corners have been rounded in the above-described manner are subjected to firing, whereby ceramic sintered bodies are formed. Thereafter, the ceramic sintered bodies are further polished further using the centrifugal barrel polishing device 1. In this case, the ceramic sintered bodies are placed into the barrel pots 5 to 8 and polished for 60 minutes, with the rotation speed of the rotary plates 2 and 3 preferably being 150 rpm and the rotation speed of the barrel pots 5 to 8 being 150 rpm. During the rotation of the rotary plate 3 in the direction of arrow Y, the ceramic layered bodies that have been placed in the barrel pots 5 to 8 move while being pushed against the outer surfaces of the barrel pots 5 to 8 in the radially outer directions of the rotary plates 2 and 3 whereby the ceramic layered bodies are polished.

Figure 6:
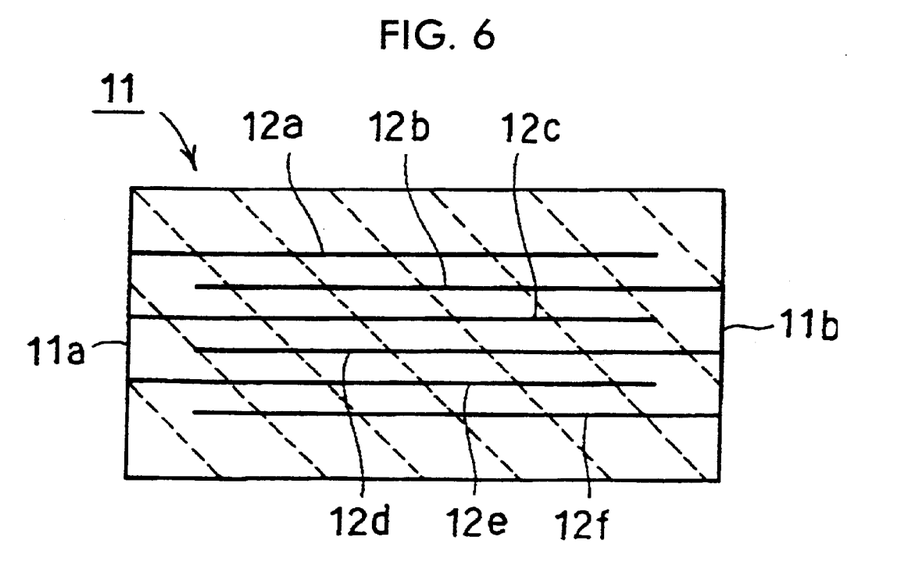
FIG. 6 is a vertical sectional view of a ceramic sintered body provided in the first embodiment.

A ceramic sintered body 11 shown in FIG. 6 is obtained by the above-described polishing method. In the ceramic sintered body 11, internal electrodes 12a to 12f are disposed in the ceramic layers so as to overlap each other in a direction of thickness thereof. The internal electrodes 12a, 12c, and 12e are exposed at the end surface 11a, while the internal electrodes 12b, 12d, and 12f are exposed at the end surface 11b. The transmissive were observed with a transmissive electron microscope. The observations confirmed that the internal electrodes 12a to 12f were completely exposed at the end surface 11a or 11b.

Figure 7:
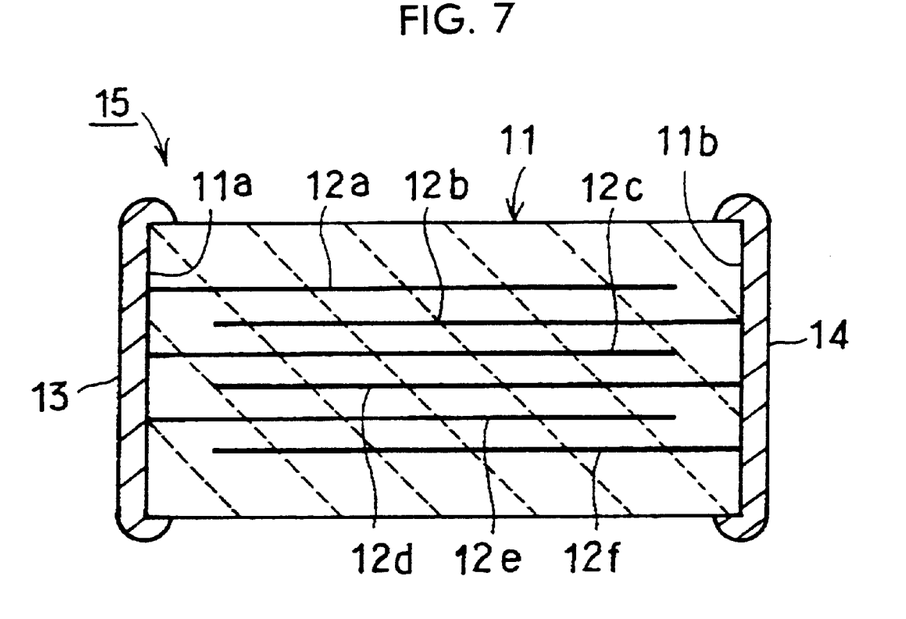
FIG. 7 is a vertical sectional view of a layered capacitor obtained in the first embodiment.

After the polishing of the ceramic sintered body 11, external electrodes 13 and 14 are formed on the end surfaces 11a and 11b of the ceramic sintered body 11 to form a layered capacitor 15, as shown in FIG. 7. The so formed layered capacitor was cut to observe the state of connection of the external electrodes 13 and 14 and the internal electrodes 12a to 12f with the electron microscope. The observations showed that the external electrodes 13 and 14 and the internal electrodes 12a to 12f were reliably connected as a result of alloying in the external electrodes 13 and 14 and the internal electrodes 12a to 12f caused by mutual scattering.

At a temperature of 85° C. and a relative humidity of 85%, a voltage of 1 WV was applied to layered capacitors obtained as described above for 1000 hours. The insulation resistance was measured before and after the application of the voltage, with a product being considered defective when the insulation resistance was reduced to $10^6$ Ω or less. The results of the measurements showed that there was no deterioration in the insulation resistance property of 100 layered capacitors.

In the method of producing a layered capacitor in the above-described embodiment, the dry-type centrifugal barrel device 1 is used to round the corners of the unsintered ceramic bodies, and the end surfaces of the obtained ceramic sintered bodies are polished, so that the internal electrodes are reliably exposed at the end surfaces of the ceramic sintered bodies. Thus, the internal electrodes and the external electrodes can be more reliably connected together, and the insulation resistance is not easily deteriorated because water is not used for the polishing. Further, many sintered ceramic bodies can be obtained at one time because many ceramic sintered bodies can be polished by placing them into the plurality of barrel pots 5 to 8.

(Second embodiment)

In the second embodiment layered capacitors whose dimensions are 2.0 mm×1.2 mm×1.2 mm and whose capacitance is 1 μF were produced.

Likely, the first embodiment, unsintered ceramic layered bodies were obtained and polished with the centrifugal barrel device 1 so that their corners were rounded. Then, like the first embodiment, they were subjected to firing to obtain ceramic sintered bodies.

In the second embodiment, the ceramic sintered bodies obtained in the above-described way were polished using a barrel-type blast device. The barrel-type blast device is described with reference to FIGS. 8 and 9.

Figure 8:
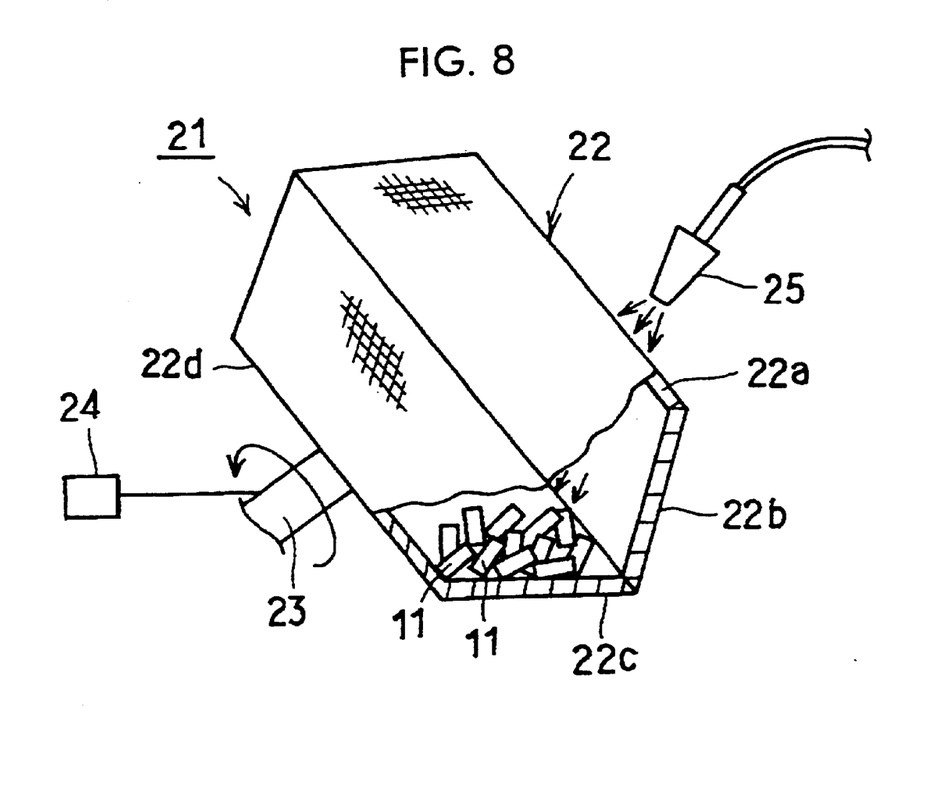
FIG. 8 is a partial cutaway side view used to illustrate a barrel-type blast device used in a second embodiment.

As shown in FIG. 8, in the barrel-type blast device 21, a barrel pot 22 with an opening 22a is used. The barrel pot 22 is shown in perspective in FIG. 9. The opening 22a is formed in the top of the barrel pot 22. The barrel pot 22 has a shape in which two side surfaces or truncated-cone-shaped portions 22b and 22c are connected together. In other words, it has a form in which its diameter is largest at the center thereof becomes smaller towards the top and bottom with increasing distance from the largest-diameter portion. A rotary shaft 23 is connected to a bottom portion 22d of the barrel pot 22. The rotary shaft 23 is connected to a rotational drive source 24. The rotational drive source 24 is any suitable rotational drive mechanism, such as a motor. Accordingly, the barrel pot 22 can rotate around the rotary shaft 23 as a center axis.

As shown in FIG. 8, a blast nozzle 25 is disposed forwardly of the opening 22a. The blast nozzle 25 is constructed so as to eject an abrasive maternal into the barrel pot 22 through the opening 22a. The abrasive is ejected from the blast nozzle 25 in a direction which is not parallel to the rotary shaft 23, but in a direction intersecting the rotary shaft 23. As shown in FIG. 8, the rotary shaft 23 preferably is tilted so that its construction is such as to allow the ceramic sintered bodies 11 put into the barrel pot 22 to accumulate on the side surface 22c side of the barrel pot 22. The abrasive is ejected from the blast nozzle 25 towards the accumulated ceramic sintered bodies 11.

Figure 9:
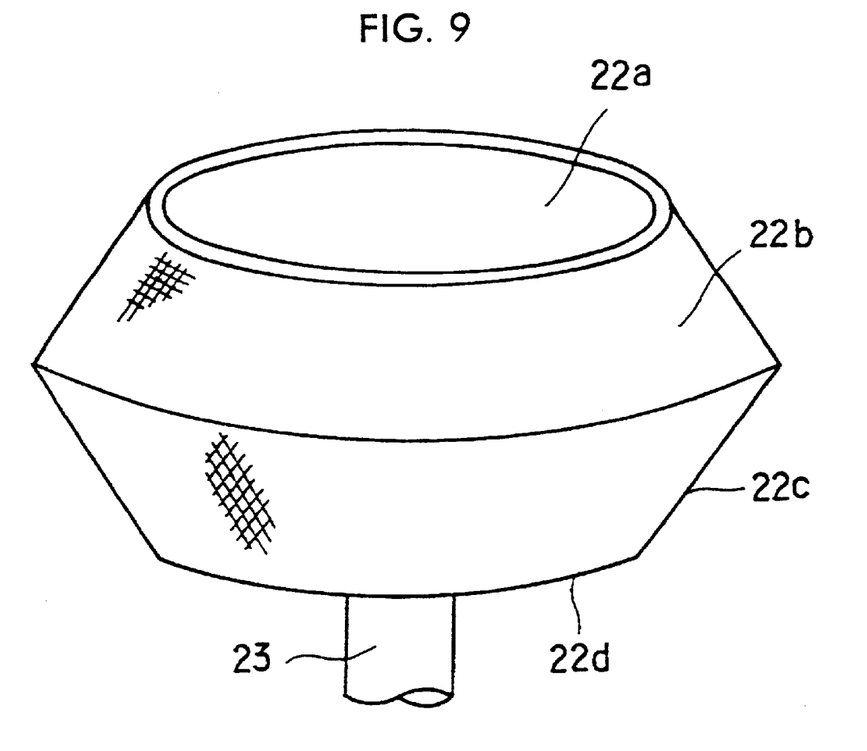
FIG. 9 is a perspective view of a barrel pot used in the second embodiment.

The entire barrel pot 22 is preferably formed of mesh, as shown schematically in FIGS. 8 and 9. Alternatively, the barrel pot 22 may be formed of a member with many through holes, or partly formed of meshes or a member with many through holes.

In short, many ceramic sintered bodies 11 were placed into the barrel pot 22 of the barrel-type blast device 21 from the opening 22a side. The barrel pot 22 was rotated at a speed of 5 rpm, #100-mesh zirconia powder was used as the abrasive which was ejected from the blast nozzle 25 under a pressure of 0.1 MPa for 15 minutes and the rotation of the barrel pot 22 was continued in order to carry out blast-type barrel polishing. The barrel pot 22 was formed of meshes, so that the abrasive and the dross resulting from the polishing was discharged out of the barrel pot 22 by the rotation thereof.

As in the first embodiment, a confirmation was made using an electronic microscope as to whether or not the internal electrodes 12a to 12f were exposed from the end surfaces 11a and 11b of the ceramic sintered bodies obtained in the above-described way. The results of the confirmation showed that the internal electrodes 12a to 12f were reliably exposed from the end surfaces 11a or 11b.

Layered capacitors were obtained using the ceramic sintered bodies obtained in the above-described way. An inspection of the connection of the external electrodes and the internal electrodes of the layered capacitors showed that they were reliably connected due to complete alloying in the external electrodes and the internal electrodes resulting from mutual scattering.

As in the first embodiment, no deterioration in the insulation resistance property of 100 layered capacitors was observed after evaluating the weatherproofness thereof.

Therefore, in the second embodiment by polishing the ceramic sintered bodies with the barrel-type blast device 21, the internal electrodes 12a to 12f can be reliably exposed from the end surface 11a or 11b of the ceramic sintered bodies, and the external electrodes and the internal electrodes can be reliably electrically connected together. Further, no deterioration in the insulation resistance property was observed because the polishing was carried out by a barrel-type blast device that does not use water.

In the second embodiment many ceramic sintered bodies can be polished at one time because many ceramic sintered bodies can be placed into the barrel pot 22 and polished.

Although in the first and second embodiments layered capacitors are produced, the ceramic electronic part producing method of the present invention can also be used to produce other types of ceramic layered electronic parts, such as layered inductors or layered varistors; or to produce ceramic electronic parts with only one internal electrode.

In the present invention, when polishing is carried out with the above-described barrel-type blast device, alumina powder or the like may be used as the abrasive, instead of zirconia powder.

According to the ceramic electronic part producing method of the present invention, the ceramic sintered bodies are polished by the dry-type barrel polishing method that does not use water in order to expose the internal electrodes from the outside surfaces of the ceramic sintered bodies. Therefore, the problems of delamination and deterioration in electrical properties, such as insulation resistance property, caused by moisture flowing in from the interfaces between the external electrodes and the ceramics, seldom occur. Therefore, it is possible to provide highly reliable ceramic electronic parts.

In addition, since the dry-type barrel polishing method is used, many ceramic sintered bodies can be processed at one time, making it possible to produce a larger number of ceramic electronic parts.

In the present invention, when the above-described centrifugal barrel device is used to carry out the above-described dry-type barrel polishing, many ceramic sintered bodies can be placed into barrel pots to subject them to the dry-type barrel polishing. Therefore, many ceramic sintered bodies can be easily polished by simply putting them into the barrel pots and driving the centrifugal barrel device. Consequently, an even larger number of ceramic electronic parts can be produced.

In the present invention, when the above-described barrel-type blast device is used to carry out the dry-type barrel polishing, the end surfaces of the ceramic sintered bodies can be easily and reliably polished by simply placing the ceramic sintered bodies into a barrel pot and ejecting an abrasive from a blast nozzle. In this case, the internal electrodes are reliably exposed from the end surfaces of the ceramic sintered bodies, and many ceramic sintered bodies can be processed at one time, so that it is possible to produce highly reliably ceramic electronic parts efficiently.

In the present invention, when the barrel pot or pots are constructed so that at least a portion or portions thereof are formed of mesh or a member with many holes, the abrasive or the drools resulting from the polishing can be quickly discharged out of the barrel pot or pots from the mesh or the many holes.

In the present invention, when the step of obtaining ceramic sintered bodies is carried out by subjecting unsintered ceramic layered bodies to dry-type barrel polishing in order to round the corners of the unsintered layered bodies, the external electrodes are reliably formed to a sufficient thickness even at the corners. Therefore, when a ceramic electronic part is mounted onto, for example, a printed circuit board, the problem of breakage of parts of wires connected to the external electrodes rarely occurs. In addition, since water is not used in the barrel polishing, the problems of deterioration in electrical properties, such as insulation resistance property, or interlayer peeling, called delamination, seldom occur in the ceramic electronic parts obtained at the final stage.

When the above-described centrifugal barrel device is used to subject unsintered ceramic layered bodies to the dry-type barrel polishing, many ceramic layered bodies can be put into and processed in barrel pots, making it possible to provide highly reliable ceramic electronic parts without reducing the number of ceramic electronic parts that can be produced.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of producing a ceramic electronic part which includes at least one internal electrode in a ceramic sintered body and at least one external electrode electrically connected to the at least one internal electrode at least one outside surface of the ceramic sintered body, the method comprising:

placing the ceramic sintered body including the at least one internal electrode into a barrel pot which is rotatable around a first axis;

rotating the barrel pot around the first axis and rotating the first axis around a second axis, independently of the rotation of the barrel pot around the first axis, so that at least one of the internal electrodes at the outside surface of the ceramic sintered body is exposed as a result of dry-barrel polishing taking place in the barrel pot; and applying the at least one external electrode to the at least one outside surface with each external electrode being electrically connected to at least one of the internal electrodes.

2. A method of producing a ceramic electronic part according to claim 1, wherein the act of rotating the barrel pot around the first axis comprises the act of using a first drive source to rotate the barrel pot and the act of rotating the first axis around the second axis comprises the act of using a second drive source, which is independent of said first drive source, to rotate the first axis around the second axis.

3. A method of producing a ceramic electronic part according to any one of claims 1 or 2, wherein at least a portion of the barrel pot is formed of a member with many holes so that abrasive used in the dry-barrel polishing and dross resulting from the dry-barrel polishing is discharged from the barrel pot through the holes without the use of a vacuum.

4. A method of producing a ceramic electronic part according to any one of claims 1 or 2, further comprising the following acts which take place before the act of placing the ceramic sintered body into the barrel pot:

placing an unsintered ceramic layered body in the barrel pot and rotating the barrel pot around at least the first axis so as to round at least one corner of the unsintered layered body by subjecting the unsintered ceramic layered body to the barrel polishing; and sintering the unsintered ceramic body after the at least one corner has been rounded to form the ceramic sintered body.

5. A method of producing a ceramic electronic part which includes at least one internal electrode in a ceramic sintered body and at least one external electrode electrically connected to the at least one internal electrode at least one outside surface of the ceramic sintered body, the method comprising:

placing the ceramic sintered body into a barrel pot which is rotatable around a first axis and which is formed of a member having many holes so that abrasive used in the dry-barrel polishing and dross resulting from the dry-barrel polishing is discharged from the barrel pot through the holes without the use of a vacuum;

rotating the barrel pot around the first axis so that at least one of the internal electrodes at the outside surface of the ceramic sintered body is exposed as a result of dry-barrel polishing taking place in the barrel pot; and applying the at least one external electrode to the at least one outside surface with each external electrode being electrically connected to at least one of the internal electrodes.

6. A method of producing a ceramic electronic part according to claim 5, further comprising the following acts which take place before the act of placing the ceramic sintered body in the barrel pot:

placing an unsintered ceramic layered body in the barrel pot and rotating the barrel pot around at least the first axis so as to round at least one corner of the unsintered layered body by subjecting the unsintered ceramic layered body to the barrel polishing; and sintering the unsintered ceramic body after the at least one corner has been rounded to form the ceramic sintered body.

7. A method of producing a ceramic electronic part which includes at least one internal electrode in a ceramic sintered body and at least one external electrode electrically connected to the at least one internal electrode at least one outside surface of the ceramic sintered body, the method comprising:

placing the ceramic sintered body including the at least one internal electrode into a barrel pot which is rotatable around a first axis;

rotating the barrel pot around the first axis and rotating the first axis around a second axis, a rotation direction around the first axis and a rotation direction around the second axis being the same direction, so that at least one of the internal electrodes at the outside surface of the ceramic sintered body is exposed as a result of dry-barrel polishing taking place in the barrel pot; and applying the at least one external electrode to the at least one outside surface with each external electrode being electrically connected to at least one of the internal electrodes.

* * * * *